United States Patent [19]

Clemons et al.

[11] 3,859,641

[45] Jan. 7, 1975

[54] DYNAMIC BUFFER CIRCUIT

[75] Inventors: Donald Gordon Clemons, Walnutport; James Howard Vogelsong, Allentown, both of Pa.

[73] Assignee: Bell Telephone Laboratories, Incorporated, Murray Hill, N.J.

[22] Filed: Dec. 10, 1973

[21] Appl. No.: 423,296

[52] U.S. Cl. ........... 340/173 R, 307/238, 340/172.5

[51] Int. Cl. ........... G11c 11/40

[58] Field of Search ...... 340/172.5, 173 R; 307/238, 307/279

[56] References Cited

UNITED STATES PATENTS

| | | | |
|---|---|---|---|
| 3,593,037 | 7/1971 | Hoff | 340/173 R |
| 3,599,180 | 8/1971 | Rubinstein | 340/173 R |

*Primary Examiner*—Terrell W. Fears
*Attorney, Agent, or Firm*—I. Ostroff

[57] ABSTRACT

An input data buffer circuit, which includes six field effect transistors, is utilized in combination with a dynamic memory in order to widen the operating margins of the memory system. The buffer circuit is fabricated on the same integrated circuit chip as the memory, so that the electrical characteristics of the transistors of the buffer circuit and of the memory will be essentially identical. The levels of the output signals of the buffer circuit are relatively independent of random variations in levels of input signals because the levels of the output signals are primarily a function of the magnitude of the common power supply used by the buffer circuit and the memory, the electrical characteristics of the transistors of the buffer circuit and the memory, and the internal and external signals utilized by the memory.

3 Claims, 2 Drawing Figures

DYNAMIC BUFFER CIRCUIT

BACKGROUND OF THE INVENTION

This invention relates to buffer circuits and, in particular, to dynamic buffer circuits for use with dynamic memory systems.

In a U.S. Pat. application, J. T. Koo 9, which is being filed concurrently with this application, and in which there is a common assignee, a memory which utilizes dynamic low-power control circuitry is described. The dynamic control circuitry is automatically timed by externally and internally created control signals. The 0 levels of these control signals, as well as the 0 level of the logic signals, are a function of the magnitude of the power supply utilized on the integrated circuit chip on which the memory is fabricated. An external data signal applied to the memory to write in new information may not always have the same range of levels of signals as exist on the integrated circuit chip which contains the memory. Such a mismatch of levels can cause extraneous information to be entered into the memory.

OBJECTS OF THE INVENTION

It is an object of this invention to provide for use with a memory a buffer circuit which is adapted to create an output signal that has levels which are compatible with the levels of signals existing within the memory.

SUMMARY OF THE INVENTION

This and other objects of the invention are attained in an illustrative embodiment which is a buffer circuit essentially made up of a plurality of field effect transistors. The source of the first transistor is coupled to a power supply and the drain is coupled to the source of a second field effect transistor. Circuitry coupled to the gate of the first transistor selectively controls when the first transistor is enabled or disabled, and consequently, determines when the drain of the first transistor is isolated from the source, and when the drain and the source both assume the potential of the power supply. Other circuitry coupled to the gate of the second transistor allows input signals to be selectively applied to the gate of the second transistor. The gate of the second transistor is coupled to the circuitry which is coupled to the gate of the first transistor.

An illustrative embodiment of the buffer circuit includes six MOS-type field effect transistors. The sources of the first, second and third transistors are coupled to a power supply +Vss. The drains of the fourth and sixth transistors are coupled to ground potential. The gate of the first transistor is coupled to the drain of the third transistor and source of the fourth transistor. The drain of the second transistor is coupled to the gates of the third and sixth transistors and to the drain of the fifth transistor. The gates of the second, fourth and fifth transistors serve as input terminals for the various control and data signals. The drain of the first transistor serves as the output terminal. The source of the fifth transistor serves as a data input terminal.

At a selected time the fifth transistor is enabled and whatever input data appears at the source of the fifth transistor is transferred to the gate of the sixth transistor. If the input data is a 0, the sixth transistor is disabled. As will be explained later, the first transistor is enabled at this time and consequently the output terminal assumes a +Vss level, which is defined as a 0 output signal. The 0 input signal should ideally also be at a +Vss level; however, since it may be created from a source potential which varies from +Vss, it is possible that the input 0 level may be several volts greater than or less than +Vss. This buffer circuit is preferably fabricated on the same integrated circuit chip which contains the memory. Accordingly, the +Vss power supply used for the buffer circuit is also used by the memory. Therefore, 0 levels created by the buffer and the memory are ideally identical.

If when the fifth transistor is enabled a 1 data input signal is applied to the source of the fifth transistor, the gate of the sixth transistor assumes a value of essentially one threshold voltage (1Vt) above the level of the gate potential of the fifth transistor. This enables the third transistor which in turn causes the gate of the first transistor to assume a potential of +Vss. This disables the first transistor. The output terminal can thus discharge from +Vss, a 0 level, to +2Vt above the potential of the gate of the fifth transistor. If the level of the input 1 signal is somewhat more positive than ground potential, but less positive than the threshold voltage of the fifth transistor, the gate of the sixth transistor still assumes a value of one threshold voltage above the potential of the gate of the sixth transistor. Since the potential of the gate of the sixth transistor is determined by conditions on the integrated circuit chip which contains the memory system, it is clear that the resulting output 1 level will be ideally identical to the 1 level existing in the memory itself more or less independent of the level of the input 1 signal.

In addition to the buffer's characteristic of providing signals to a memory array, which are comparable to signal levels existing on the array, the power dissipation of the buffer circuit is relatively low.

These and other objects and features of the invention will be better understood from a consideration of the following detailed description taken in conjunction with the following drawings.

DETAILED DESCRIPTION

Figure 1:
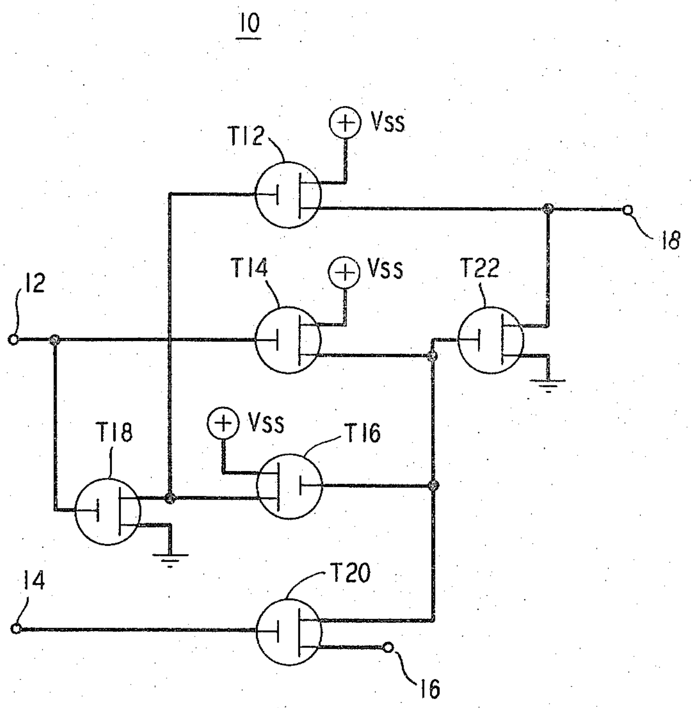
FIG. 1 illustrates in circuit schematic form an illustrative embodiment of the invention.

Referring now to FIG. 1 there is illustrated a data input buffer circuit 10 which comprises six p-channel insulated gate field effect transistors, T12, T14, T16, T18, T20 and T22. The source, gate and drain of T12 are coupled to a power supply +Vss, the source of T18, and the source of T22, respectively. A terminal 18 is coupled to the source of T22. The source, drain and gate of T14 are coupled to +Vss, the gate of T22 and a terminal 12, respectively. The source, drain and gate of T16 are coupled to +Vss, the source of T18, and the gate of T22, respectively. The gate and drain of T18 are coupled to the terminal 12 and a point of ground potential, respectively. The drain of T22 is coupled to a point of ground potential. The drain of T20 is coupled to the gates of T16 and T22 and to the drain of T14. A terminal 14 is coupled to the gate of T20 and a terminal 16 is coupled to the source of T20. The drain and source of a field effect transistor reverse as the direction of current flow through the transistor reverses. Terminals 12 and 14 serve as inputs for control signals and terminal 16 serves as data input terminal. Terminal 18 serves as the output terminal.

The circuit described is useful as an input buffer in a dynamic memory. As such it serves as an interface between the information source providing the signals to be stored and the memory providing the storage locations.

The particular embodiment described has been designed specifically for use with a memory of the kind described in the aforementioned Koo copending application.

In particular, when used in conjunction with such a memory, the $\overline{C}$ and CSC signals and the data input waveform DI as defined therein are applied to the terminals 12, 14 and 16, respectively, of FIG. 1. The output waveform appearing at terminal 18 is applied to the read-rewrite circuit 18 shown in FIGS. 5A and 5B of copending Koo application, thereby eliminating the need for transistor TD1 shown in FIGS. 5A and 5B.

Advantageously, the circuit shown would be included on the same chip as the memory proper so that each of these transistors would have operating characteristics similar to those in the memory proper.

An important consideration for the use of a data input buffer circuit with the Koo memory is that the level of 0 data input signals may vary from the 0 signal level which exists on an integrated circuit chip on which the memory is fabricated. The 0 level on the chip is essentially equal to the potential of the power supply +Vss utilized on the chip. If an externally supplied 0 has a value which is several volts more positive than the internally created 0, the TDI transistor shown in FIGS. 5A and 5B of the Koo 9 application may be enabled and thereby permit erroneous signals to be introduced in the memory system.

Figure 2:
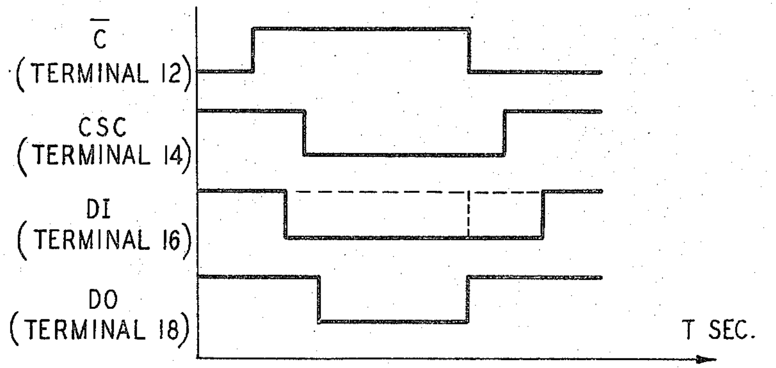
FIG. 2 graphically illustrates input waveforms applied to the circuit of FIG. 1 and the resulting output waveform as a function of time with particular reference to the use of the buffer circuit in conjunction with the memory described in the aforementioned Koo application.

Referring now to FIG. 2, there is graphically illustrated, as a function of time, the waveforms $\overline{C}$, CSC and DI, which are applied to terminals 12, 14 and 16, respectively, of the buffer circuit. The resulting output waveform DO, which appears at terminal 18, is also illustrated as a function of time. Initially $\overline{C}$ is a 1 (typically 0 volts) and CSC is a 0 (typically +16 volts). Accordingly, T14 and T18 are initially enabled, and T20 is initially disabled. A transistor is defined as being enabled if the gate thereof is biased such that a channel exists between the drain and source of the transistor that permits conduction therethrough. A transistor is denoted as disabled when no such channel exists and there can be essentially no conduction through the transistor. The above input signal conditions cause the drains of T14 and T20 and the gates of T22 and T16 to charge up to +Vss (typically +16 volts). This disables T22 and T16.

Since at this point in time T18 is enabled, the source of T18 and the gate of T12 assume a potential level of +1Vt above the potential of the gate of T18, which is a 1 level (typically ground potential). This +1Vt level is sufficient to enable T12 and thus cause terminal 18 (the drain of T12) to charge to +Vss, a 0 level. It is to be noted that since at this point in time T16, T20 and T22 are disabled there is no dc current flow possible.

Now $\overline{C}$ is switched to a 0 while CSC is still at the 0 level. This condition disables T14 and T18 and thereby allows the gate of T12 to float in potential at +1Vt above ground potential. T12 therefore remains enabled and the potential of terminal 18 is maintained at +Vss.

Before CSC is pulsed to a 1 input data information DI comprising a 1 or a 0 is applied to terminal 16. The CSC signal is now pulsed to a 1 level to enable T20. If the data input signal at terminal 16 is a 1 (which is ideally at or near ground potential), the drain of T20 is discharged to within +1Vt of the level of the applied 1. T22 is therefore enabled. Consequently, T12 is disabled since T16 is enabled and the drain of T16 and the gate of T12 are charged to +Vss. Since T22 is enabled, terminal 18 can discharge from +Vss through T22, which conducts to ground potential. Terminal 18 discharges from +Vss to +2Vt above the potential of the gate of T20. This output level is defined as a 1. $\overline{C}$ now returns to a 1 level. This again enables T14 and T18. The drain of T14 rapidly returns from +1Vt above ground potential to +Vss. Thus T16 and T22 are disabled. Because T18 is enabled, the drain of T18 discharges from +Vss to +1Vt above ground potential. Thus T12 once again is enabled and terminal 18 is again charged back to +Vss. The CSC signal then again returns to the 0 level and a new cycle can begin.

The level of the DI 1 signal can be as positive as one threshold voltage above ground potential without having any detrimental effect on the level of the output 1. This is due to the fact that the drain of T20 will assume a potential of +1Vt above the potential of the gate of T20 as long as the level of the input signal is less than or equal to one threshold potential.

If prior to the time the CSC signal is pulsed from the initial 0 level to the 1 level, the data input signal at terminal 16 is a 0 instead of a 1, then the potential of the drain of T20 remains essentially at +Vss and T22 and T16 remain disabled. T12 remains enabled and terminal 18 therefore remains at +Vss, a 0 level.

The input 0 signal level may be more positive than a normal 0 level (typically +16 volts) without any detrimental effect on the memory system. A More positive level than +16 volts (the typical 0 level) results in T22 and T16 being more disabled than is caused by a +16 volt level. Thus since T16 is disabled and the gate of T12 floats in potential at +1Vt above ground potential, T12 continues to be enabled. Thus terminal 18 remains at +Vss, a 0. This 0 level is ideally identical to other 0 levels which exist on the integrated circuit chip which contains the entire memory system of J. T. Koo 9. The level of an input 0 level which is more positive than the 0 level that exists in the J. T. Koo 9 memory system is transformed by the buffer circuit 10 to the level of a 0 which exists in the memory system.

If the level of an input 0 is somewhat lower than exists in the memory system, the output of the input data buffer circuit 10 still maintains ideally the same 0 level as exists in the memory system. As long as the level of the input 0 is within one threshold value of +Vss, T16 and T22 remain disabled. Accordingly, T12 remains enabled and terminal 18 remains charged at +Vss, a 0 level which is ideally identical to all 0 levels in the memory system.

The output 1 and 0 levels of the input data buffer circuit 10 are ideally identical to those levels existing within the memory system described in J. T. Koo 9 even when the input signal levels to the buffer are not. This results in a widening of the operating margins of the entire memory system.

As is illustrated in FIG. 2 a DI 1 input data signal is typically maintained until sometime after the $\overline{C}$ signal returns to the 1 level. The continuation of the DI 1 input signal after the $\overline{C}$ input is returned to the 1 level allows T12 and T22 to both be enabled until the CSC signal returns to a 0 level. This means that during this time interval a dc path exists between +Vss and ground potential. In the memory system described in the copending J. T. Koo 9 application this time interval is typically only 25 nanoseconds. The typical power dissipation of the buffer circuit, when utilized as part of the memory system described in copending J. T. Koo 9 application is only 2 milliwatts. Consequently there is dc operation for this period of time.

The above-described dc path can be eliminated by returning the input DI signal to a 0 at the same time that $\overline{C}$ is returned to a 1. This would disable T22 and therefore not allow a dc path between +Vss, T12, T22, and ground potential to exist. The dashed vertical line of the DI waveform of FIG. 2 illustrates this possible operating mode.

From a system point of view it is undesirable to require the turning off of an input data 1 to the 0 level at the same time the $\overline{C}$ signal returns to a 1. The minor savings of power dissipation is far outweighed by the relaxed timing requirements.

It is to be understood that the embodiment described herein is merely illustrative of the general principles of the invention. Various modifications are possible within the scope of the invention. For example, n-channel insulated gate field effect transistors can be substituted for the p-channel insulated gate field effect transistors providing all the appropriate voltages are adjusted. Still further, additional transistor circuitry can be added to the buffer circuit such that when the $\overline{C}$ signal returns to a 1 level, there is no dc path between +Vss and terminal 16 even though a 1 level still appears at the DI input.

What is claimed is:

1. A buffer circuit comprising:

first circuit means including a control port, a first port and a second port, said first means being adapted to selectively appear as an open or short circuit such that a voltage level applied to the first port is either isolated from or coupled to the second port;

second circuit means coupled to the control port of the first means for selectively causing the first means to appear as a short circuit;

third circuit means coupled to the control port of the first means for selectively causing the first means to appear as an open circuit; said third means including a control port;

fourth circuit means coupled to the control port of the third circuit means for selectively controlling when the third circuit means causes the first circuit means to appear as an open circuit;

fifth circuit means including a control port, a first port, and a second port;

the first port of the fifth circuit means being coupled to the second port of the first circuit means; and a sixth circuit means coupled to the control ports of the third and fifth circuit means, said sixth circuit means being adapted to selectively allow signal information applied thereto to be applied to the control ports of the third and fifth circuit means.

2. A buffer circuit comprising six insulated gate field effect transistors T1-T6, each of the transistors comprising a first terminal, a second terminal, and a control terminal;

the control terminal of T1 being coupled to the second terminal of T3 and the first terminal of T4;

the second terminal of T1 being coupled to the first terminal of T6;

the control terminal of T3 being coupled to the second terminal of T2, the control terminal of T6, and the second terminal of T5; and the control terminal of T2 being coupled to the control terminal of T4.

3. The apparatus of claim 2 wherein:

the control terminals of T2 and T5 serve as input terminals and the first terminal of T6 serves as the output terminal.

* * * * *